(12) United States Patent
Jaaskelainen et al.

(10) Patent No.: US 10,705,242 B2
(45) Date of Patent: Jul. 7, 2020

(54) DOWNHOLE SENSOR DEPLOYMENT ASSEMBLY (71) Applicant: Halliburton Energy Services, Inc., Houston, TX (US)

(72) Inventors: Mikko Jaaskelainen, Katy, TX (US); Ahmed Elsayed Fouda, Houston, TX (US); Brian Vandellyn Park, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 248 days.

(21) Appl. No.: 15/545,665

(22) PCT Filed: Feb. 26, 2015

(86) PCT No.: PCT/US2015/017632
§ 371 (c)(1),
(2) Date: Jul. 21, 2017

(87) PCT Pub. No.: WO2016/137462
PCT Pub. Date: Sep. 1, 2016

(65) Prior Publication Data
US 2018/0003850 A1    Jan. 4, 2018

(51) Int. Cl.
*G01V 3/26*     (2006.01)
*G01V 3/38*     (2006.01)
*E21B 49/00*    (2006.01)
*E21B 17/10*    (2006.01)
*E21B 47/00*    (2012.01)
(Continued)

(52) U.S. Cl.
CPC ............ *G01V 3/26* (2013.01); *E21B 17/1021* (2013.01); *E21B 47/0005* (2013.01); *E21B 47/01* (2013.01); *E21B 47/12* (2013.01); *E21B 49/005* (2013.01); *G01V 3/20* (2013.01); (Continued)

(58) Field of Classification Search
None
See application file for complete search history.

(56) References Cited

U.S. PATENT DOCUMENTS 2,879,323 A    3/1959  Nichols
5,092,423 A    3/1992  Petermann
(Continued)

OTHER PUBLICATIONS

International Search Report and Written Opinion from PCT/US2015/017632, dated Oct. 30, 2015.

*Primary Examiner* — Douglas X Rodriguez
(74) *Attorney, Agent, or Firm* — Gilliam IP PLLC (57) ABSTRACT A downhole sensor deployment assembly includes a body attachable to a completion string and one or more arms pivotably coupled to the body. A sensor pad is coupled to each arm and movable from a retracted position, where the sensor pad is stowed adjacent the completion string, and an actuated position, where the sensor pad is extended radially away from the completion string. One or more actuators are pivotably coupled to the body at a first end and pivotably coupled to a corresponding one of the one or more arms at a second end, the one or more actuators being operable to move the sensor pad to the actuated position. One or more sensor devices are coupled to the sensor pad for determining a resistivity of a formation, the one or more sensor devices comprising at least one of a sensing electrode, a transceiver, and a transmitter.

15 Claims, 5 Drawing Sheets (51) Int. Cl.
  *E21B 47/01* (2012.01)
  *G01V 3/20* (2006.01)
  *E21B 47/12* (2012.01)
  *G01V 3/30* (2006.01)
  *G01V 8/02* (2006.01)

(52) U.S. Cl.
  CPC .............. *G01V 3/30* (2013.01); *G01V 3/38* (2013.01); *G01V 8/02* (2013.01)

(56) References Cited

U.S. PATENT DOCUMENTS

| | | |
|---|---|---|
| 5,883,583 A | 3/1999 | Kishino |
| 8,322,415 B2 | 12/2012 | Loretz et al. |
| 2006/0107736 A1 | 5/2006 | Cens et al. |
| 2010/0089583 A1* | 4/2010 | Xu ................. E21B 10/322 166/298 |
| 2010/0206064 A1 | 8/2010 | Estes |
| 2012/0131996 A1 | 5/2012 | Anish et al. |
| 2012/0175135 A1 | 7/2012 | Dyer et al. |
| 2013/0293235 A1* | 11/2013 | Bloemenkamp ......... G01V 3/24 324/356 |
| 2016/0237803 A1* | 8/2016 | Patel ................. E21B 33/13 |

* cited by examiner

DOWNHOLE SENSOR DEPLOYMENT ASSEMBLY

BACKGROUND

During the production of hydrocarbons from a wellbore and/or during the placement of one or more completion strings (e.g., strings of casing) in the wellbore, one or more properties of the wellbore and surrounding subterranean formations may need to be measured. For instance, electromagnetic (EM) sensors are often deployed in completion strings to make azimuth measurements, which can be used to detect the direction of an approaching water flood.

One challenge with deploying EM sensors is that the transmitters and receivers associated with the EM sensors should be positioned as close as possible to the surrounding subterranean formation while being isolated and as far away as possible from the completion string. To accomplish this, various designs with EM sensors on centralizers and swell packers have been proposed, and the challenge with these designs is the fact that the clearance between the EM sensors and the formation while being run into the wellbore is very limited. As a result, the EM sensors often run the risk of abrasion or being crushed while conveyed to a target location within the wellbore.

Once reaching the target location, deploying EM sensors on a completion string is traditionally done using swellable packers or packer elements. However, this requires machined packers for every location where a sensor is required, and therefore can be cost prohibitive for a system where several EM sensors are to be used. Moreover, sensors deployed through the use of swellable packers or packer elements may also be damaged due to abrasion and/or crush forces since such sensors need to be located on the outside of the swell packer for them to contact the surrounding formation once the packer swells. On the other hand, deploying EM sensors positioned on spring centralizers may cause the EM sensors to drag against the formation while being run downhole, and thereby risking drag/abrasion damage to the EM sensors.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to downhole tools and, more particularly, to downhole sensor deployment assemblies that protect associated sensors during run-in and are used to measure wellbore properties during operation.

Exemplary downhole sensor deployment assemblies described herein include a body attachable to a completion string and one or more arms pivotably coupled to the body. A sensor pad is coupled to each arm and movable from a retracted position, where the sensor pad is stowed adjacent the completion string, and an actuated position, where the sensor pad is extended radially away from the completion string. One or more actuators are pivotably coupled to the body at a first end and pivotably coupled to a corresponding one of the one or more arms at a second end, the one or more actuators being operable to move the sensor pad to the actuated position. One or more sensor devices are coupled to the sensor pad for determining a resistivity of a formation. The exemplary downhole sensor deployment assemblies of the present disclosure provide a solution that allows deployment of sensor pads (e.g., transmitters, receivers, transceivers) in a protected manner while allowing good formation reservoir contact once the completion string has reached its target depth, and without additional cables for arm actuation.

Figure 1A:
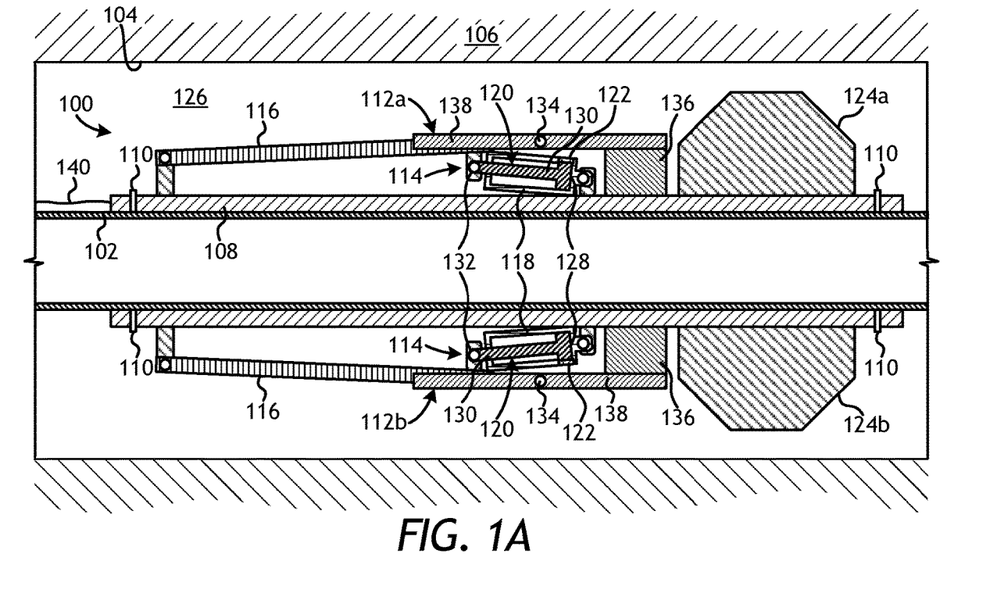
FIGS. 1A and 1B are cross-sectional side views of an exemplary downhole sensor deployment assembly.
Figure 1B:
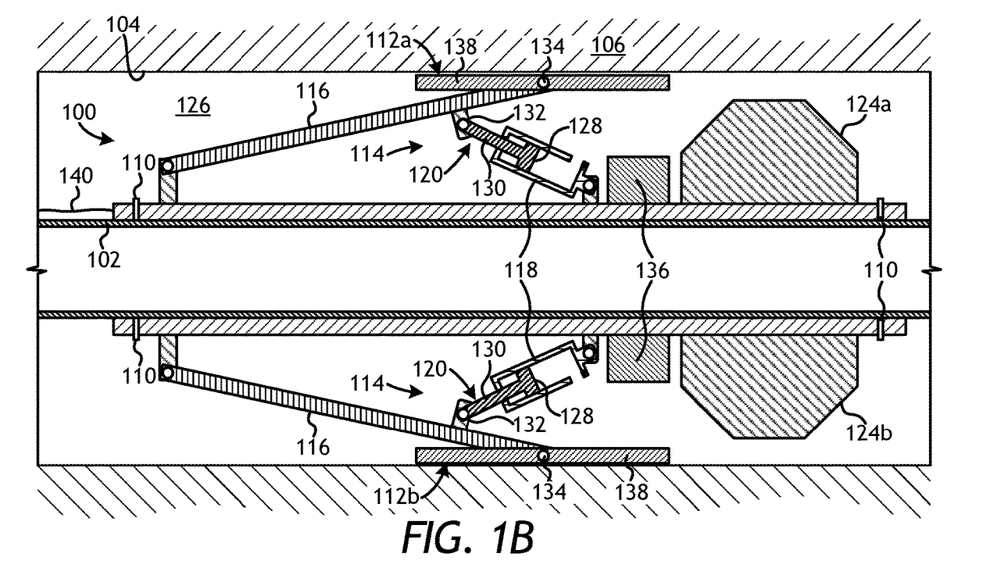

Referring to FIGS. 1A and 1B, illustrated are cross-sectional side views of an exemplary downhole sensor deployment assembly 100, according to one or more embodiments. As illustrated, the downhole sensor deployment assembly 100 (hereafter "the assembly 100") may be coupled to a completion string 102 and extended within a borehole 104 drilled through one or more subterranean formations 106. The completion string 102 may comprise a plurality of tubing lengths coupled at each end and may be any type of wellbore tubular or piping known to those skilled in the art including, but not limited to, casing, production tubing, coiled tubing, any combination thereof, and the like. The assembly 100 may include a generally cylindrical body 108 coupled or otherwise attached to the completion string 102 using one or more mechanical fasteners 110 (e.g., bolts, screws, pins, snap rings, etc.). In other embodiments, however, the body 108 may be secured to the completion string 102 by other means such as, but not limited to, welding, brazing, industrial adhesives, an interference fit, and any combination thereof.

The assembly 100 may further include one or more sensor pads 112 (two shown as sensor pads 112a and 112b). While FIGS. 1A and 1B depict two sensor pads 112a,b, it will be appreciated that more or less than two sensor pads 112a,b may be employed in the assembly 100. For instance, in at least one embodiment, the assembly 100 may employ six sensor pads 112 equidistantly spaced about the circumference of the body 108 (i.e., at 60° intervals). In the illustrated embodiment, the sensor pads 112 are depicted as being angularly spaced from each other by 180° about the circumference of the body 108.

The sensor pads 112a,b may be movable from a retracted position, as shown in FIG. 1A, to an actuated position, as shown in FIG. 1B. In the retracted position, the sensor pads 112a,b may be stowed near the completion string 102 and resting at least partially on a pedestal 136. In the actuated position, the sensor pads 112a,b may be extended toward and/or into contact with the wall of the borehole 104. To move the sensor pads 112a,b to the actuated configuration, each sensor pad 112a,b may be operatively coupled to a corresponding actuator 114 and an arm 116. The arms 116 may be pivotably coupled to the body 108 at one end and the sensor pads 112a,b may be coupled to arm 116 at the opposing end. In some embodiments, the arms 116 may be conductive structural members and, therefore, able to conduct current between the completion string 102 and the sensor pads 112a,b. In other embodiments, however, the arms 116 may be made of non-conducting materials and otherwise serve to electrically insulate the sensor pads 112a,b from the completion string 102.

The actuator(s) 114 may be pivotably coupled to the body 108 at one end and pivotably coupled to the arm 116 at a second end (e.g., at a pivot point 132). The actuator(s) 114 may be any type of actuation device operable to move the arm 116 and thereby move the sensor pads 112a,b from the retracted position to the actuated position. In the illustrated embodiment, the actuator 114 is depicted as a hydraulic piston actuator, but could equally comprise any type of hydraulic actuator, pneumatic actuator, electric actuator, motor, or electromechanical actuator known to those skilled in the art, without departing from the scope of the disclosure.

As illustrated, the actuator 114 may include a piston chamber 118, a piston 120 movably positioned within the piston chamber 118, and a frangible member 122 arranged in a wall of the piston chamber 118. The frangible member 122 may be any device or mechanism configured to fail upon assuming a predetermined load, such as a predetermined pressure threshold. In the illustrated embodiment, the frangible member 122 is depicted as a burst disk but may equally comprise a shear pin, a shear ring, or the like. The frangible member 122 may be configured to isolate the piston chamber 118 from the surrounding environment and may fail upon assuming a predetermined pressure threshold or differential between the piston chamber 118 and the surrounding environment.

The assembly 100 may further include one or more centralizers 124 (two shown as centralizers 124a and 124b) used to generally maintain the assembly 100 centered within the borehole 104. In the illustrated embodiment, the centralizers 124a,b may comprise, for example, fins welded to and extending radially outward from the body 108. In other embodiments, however, the centralizers 124a,b may comprise any other type of centralizing device or assembly known in the art. The centralizers 124a,b may exhibit an outside diameter that is greater than the outside diameter of the sensor pads 112a,b while in the retracted position. Consequently, the centralizers 124a,b may prove advantageous in protecting the sensor pads 112a,b and the arms 116 from abrasion as the assembly 100 is extended into the borehole 104 in the downhole direction (i.e., to the right in FIGS. 1A and 1B).

While two centralizers 124a,b are depicted in FIGS. 1A-1B, it will be appreciated that more or less than two centralizers 124a,b may be employed. Moreover, while the centralizers 124a,b are depicted as being positioned downhole from the sensor pads 112a,b (i.e., to the right of the sensor pads 112a,b), one or more additional centralizers (not shown) may be positioned uphole from the sensor pads 112a,b (i.e., to the left of the sensor pads 112a,b), without departing from the scope of the disclosure. As will be appreciated, the centralizers 124a,b located downhole from the sensor pads 112a,b may help prevent abrasion to the sensor pads 112a,b while the assembly 100 is moved in the downhole direction, and centralizers located uphole from the sensor pads 112a,b may help prevent abrasion to the sensor pads 112a,b while the assembly 100 is moved in the uphole direction.

Exemplary operation of the assembly 100 is now provided. The assembly 100 may be introduced into the borehole 104 from a surface location (not shown) as coupled to the completion string 102. During "run-in" into the borehole 104, the assembly 100 may be in the retracted position, as shown in FIG. 1A. Upon reaching a target location (e.g., total depth), the actuator(s) 114 may be activated and otherwise triggered for operation. In some embodiments, the actuator(s) 114 may be activated by sending a command signal to the actuator(s) 114 from the surface location (either manually or automated), which triggers actuation of the actuator(s) 114. In such embodiments, the actuator(s) 114 may comprise mechanical or electromechanical devices that mechanically operate in response to receiving the command signals.

In other embodiments, however, the actuator(s) 114 may be activated by increasing a fluid pressure within the annulus 126 defined between the completion string 102 and the wall of the borehole 104. More particularly, the fluid pressure within the annulus 126 may be pressurized to a point that surpasses the predetermined threshold for the frangible member 122 (e.g., a predetermined pressure limit), thereby resulting in failure of the frangible member 122. Once the frangible member 122 fails, fluids seeking pressure equilibrium may escape into the piston chamber 118, and the influx of such fluids may impinge upon a head 128 of the piston 120 and thereby move the piston 120 within the piston chamber 118. As the piston 120 moves, a stem 130 that extends from the head 128 may progressively extend out of the piston chamber 118. The stem 130 may be operatively coupled to the arm 116 at a pivot point 132 such that, as the piston 120 moves within the piston chamber 118, the stem 130 correspondingly acts on the arm 116 via the pivot point 132, as shown in FIG. 1B.

As the stem 130 acts on the arm 116 via the pivot point 132, the arm 116, in turn, may act on the corresponding sensor pad 112a,b at a pivot point 134 to move the sensor pad 112a,b from the retracted position to the actuated position. More particularly, the sensor pads 112a,b may be raised off the corresponding pedestals 136 and toward the wall of the borehole 104 to make physical contact with the formation 106. Once in contact with the formation 106, cement (not shown) may be pumped into the annulus 126 to permanently secure the assembly 100 at the target location in the borehole 104.

In some embodiments, the cement may be selected based on a desired electrical conductivity to tailor the operational properties of the assembly 100 for long-term use in the borehole 104. For example, in some embodiments, it may prove advantageous to use cement that exhibits the same or substantially the same resistivity as the formation 106. In other embodiments, however, it may be desired to use a cement with a resistivity that is different from that of the formation 106. The resistivity of the cement may be manipulated to the desired electrical conductivity by mixing various additives into the cement slurry. Suitable additives that may be added to the cement to manipulate its resistivity include, but are not limited to, a ceramic powder, an epoxy resin, a polyester resin, metal traces, and any combination thereof. As will be appreciated, an additive used in the cement may also be selected such that it generally does not affect the integrity of the cement after setting.

The sensor pads 112a,b may each include and otherwise comprise one or more sensor devices 138. In some embodiments, the sensor devices 138 may be used to acquire data from the formation 106 and/or from the wall of the borehole 104. In other embodiments, in addition to a sensing capacity, the sensor devices 138 may serve as transceivers configured for transmissions toward the formation 106 and/or the wall of the borehole 104. In yet other embodiments, the sensor devices 138 may comprise a device serving solely as a transmitter. Accordingly, as used herein, the term "sensor device" and any variation thereof may refer to the sensor devices 138 being used as a sensing device or electrode, as a transceiver able to send and receive signals, or as a transmitter configured to solely transmit signals.

When used as sensing electrodes, the sensor devices 138 (or transceivers) may be positioned as depicted in FIG. 1B to acquire data from the bore hole 104 or the formation 106 including, but not limited to, pressure, temperature, resistivity, hydrophone, vibration (i.e., seismic), acoustic, geophone, streaming potential, multiple axis accelerometer, strain, electromagnetic, magnetic, acidity, dipole, capacitance, dielectric, chemical detection (including carbon dioxide), and a host of others. When used as a transmitter (or transceiver) the sensor devices 138 may similarly be geared toward emission or transmission of an electromagnetic, acoustic, electrical dipole, vibrator, or sonic nature. While the embodiments described herein discuss the sensor devices 138 in conjunction with the detection and/or transmission of electromagnetic signals, it will be appreciated that the sensor devices 138 may equally be used in accordance with any of the other measurement and/or transmission approaches mentioned herein.

Data acquired by the sensor devices 138 may be telemetrically conveyed to a surface location (not shown) via a communication line 140 extending from the assembly 100. The communication line 140 may be electric, hydraulic, fiber optic, or another suitable type of line, wire, or conduit capable of conveying data and/or power to/from the assembly 100. The communication line 140 may be supported externally by the completion string 102, but may alternatively be incorporated into the tubing structure itself, for example, in combination with electrical or hydraulic downhole wetmate systems. In other embodiments, the line 140 may be replaced or supplemented with a wireless telemetry device, such as a mud pulse or electromagnetic pulse device or a radio frequency transmitter, without departing from the scope of the disclosure.

Accordingly, via the communication line 140 (or wirelessly), the assembly 100 may be in communication with surface equipment (not shown), which may be configured to receive and analyze the data detected by the sensor devices 138 and determine one or more downhole conditions, such as those pertaining to the formation 106. Moreover, the surface equipment may be used to control signal transmissions from the sensor devices 138, such as in the case of transmitter or transceiver use. More particularly, in embodiments where the sensor devices 138 comprise transceivers or transmitters, the surface control equipment may direct signal transmissions into the formation 106 by the sensor devices 138, perhaps followed by analysis of detected information as a result of such transmissions.

In some embodiments, the sensor devices 138 may comprise optical electromagnetic sensors, which operate to detect electromagnetic fields and invert such electromagnetic fields to obtain the resistivity of the surrounding formation 106. The final output of the assembly 100 could either be resistivity or field due to flood, depending on the post-processing algorithm used. Direct field measurement is comparatively straightforward, while converting the direct measurement to resistivity makes the post-processing more complicated. Briefly, a physical perturbation in the optical electromagnetic sensors interacts with an optical waveguide to directly modulate light traveling through the waveguide. This modulated signal travels back along the same or another waveguide to a signal interrogation system, where the signal is demodulated, and the corresponding perturbation is determined.

Preferably, an optical fiber (or another optical waveguide, such as an optical ribbon, etc.) is bonded to or jacketed by a ferromagnetic material which is a magnetostrictive material used as a magnetic field receiver. Such materials undergo a change in shape or dimension (e.g., elongation or contraction) in the presence of a magnetic field. This property is known as magnetostriction. Some widely used magnetostrictive materials are Co, Fe, Ni, and iron-based alloys METGLAS™ and TERFENOL-D™. The sensor devices 138 can be used to measure electric fields when the optical waveguide is bonded to or jacketed by a ferroelectric material which is an electrostrictive material. Ferroelectric materials undergo a change in shape or dimension in the presence of an electric field. This property is known as electrostriction. Some examples of electrostrictive ceramics are lead magnesium niobate (PMN), lead magnesium niobate-lead titanate (PMNPT) and lead lanthanum zirconate titanate (PLZT).

In operation, when the magnetostrictive material changes shape, the length of the optical waveguide bonded to or jacketed by the material is elongated or contracted, and strain is thus induced in the waveguide due to the electromagnetic field. The strain (due to magnetostriction or electrostriction of the material) can be measured using various interferometric methods, such as Mach-Zehnder, Michelson, Sagnac, Fabry-Perot, etc.

In other embodiments, the sensor devices 138 may comprise distributed feedback fiber laser strain sensors that enable EM field measurements. In such embodiments, the sensor devices 138 may be integrated into the fiber optic communication line 140 to obtain EM field measurements and communicate those measurements to a surface interface. The surface interface may include an optical port for coupling the optical fiber(s) of the communication line 140 to a light source and a detector, and the light source may transmit pulses of light along the communication line 140 to excite the sensor devices 138. The sensor devices 138 retransmit the energy as laser pulses to provide measurements of field strength, field gradient, or time derivative for electrical fields and/or magnetic fields. The frequency of the laser light pulses enable the detector to responsively produce an electrical output signal indicative of the sensor measurements. In some embodiments, the frequency shift caused by the distributed feedback fiber laser strain sensor is correlated with a measure of electrical field strength or gradient.

Figure 2A:
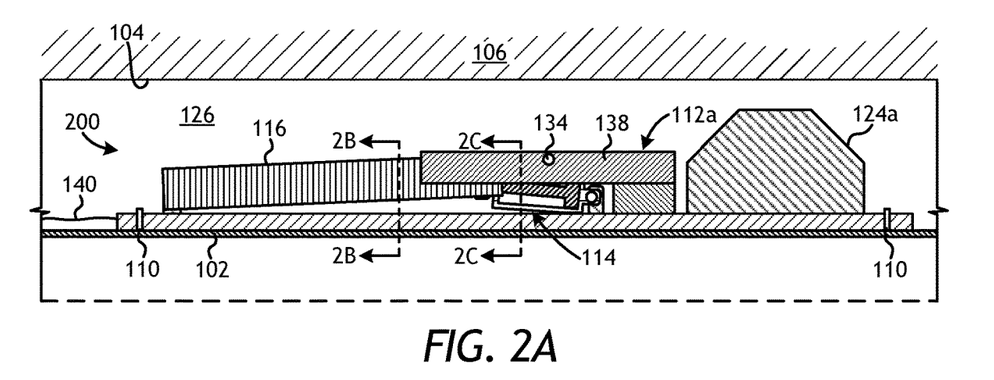
FIG. 2A is a cross-sectional side view of another exemplary downhole sensor deployment assembly.

Referring now to FIG. 2A, with continued reference to FIGS. 1A-1B, illustrated is a cross-sectional side view of another exemplary downhole sensor deployment assembly 200, according to one or more embodiments. The downhole sensor deployment assembly 200 (hereafter "the assembly 200") may be similar in some respects to the assembly 100 of FIGS. 1A-1B and therefore may be best understood with reference thereto, where like numerals represent like elements not described again in detail. As illustrated, the assembly 200 may be coupled to the completion string 102 and extended within the borehole 104 drilled through the formation 106. Similar to the assembly 100 of FIGS. 1A-1B, the assembly 200 may include the body 108 coupled to the completion string 102, and one or more sensor pads 112 (one shown as sensor pad 112a) movable between the retracted and actuated positions using the actuator 114 and the arm 116.

Figure 2B:
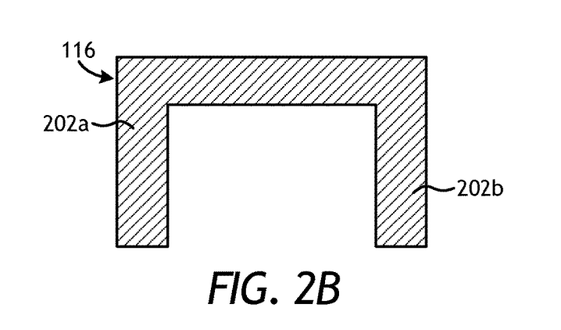
FIGS. 2B and 2C are cross-sectional end views of the downhole sensor deployment assembly of FIG. 2A as taken along lines 2B-2B and 2C-2C, respectively, of FIG. 2A.
Figure 2C:
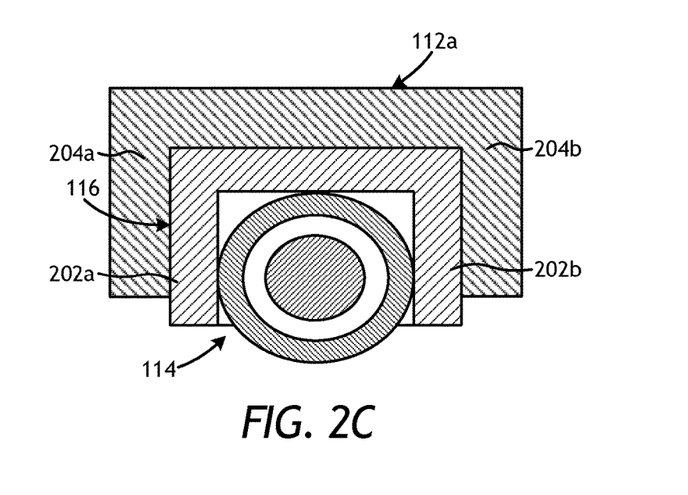

Unlike the assembly 100 of FIGS. 1A-1B, however, the sensor pad 112a and the arm 116 of the assembly 200 may be designed and otherwise configured to provide added protection for the actuator 114 and any communication cables (e.g., electrical wires, lines, conduits, etc.) used in the assembly 200. FIGS. 2B and 2C each depict a cross-sectional end view of the assembly 200 as taken along lines 2B-2B and 2C-2C, respectively, of FIG. 2A. FIG. 2B depicts the arm 116 in a general U-shape having sides 202a and 202b that extend downward. FIG. 2C depicts the arm 116 and its sides 202a,b extending around the actuator 114 and being nested within the sensor pad 112a, which is also formed generally in a U-shape having sides 204a and 204b that extend downward along at least a portion of the sides 202a,b. As the assembly 200 is run into the borehole 104 (FIG. 2A), the sides 202a,b, 204a,b of the arm 116 and the sensor pad 112a may extend over the actuator 114 and any communication cables associated with the assembly 200 and thereby provide added protection against abrasion or damage.

It will be appreciated that the assembly 100 may further be configured for use in through-casing sensing, through-casing resistivity measurements or, alternatively, casing inspection (e.g., for corrosion), without departing from the scope of the disclosure. In such embodiments, the assembly 100 may be introduced into the borehole 104 as coupled to the completion string 102, where the borehole 104 is lined at least partially with a casing string (not shown). Upon locating a target location within the casing string, the actuator(s) 114 may be activated as generally described herein to move the sensor pads 112a,b from the retracted position to the actuated position and in contact with the inner wall of the casing string. Once in contact with the casing string, the sensor devices 138 may be used to acquire data from the formation 106 and/or from the casing string. Again, any data acquired by the sensor devices 138 may be telemetrically conveyed to a surface location (not shown) via the communication line 140, which may place the assembly 100 in communication with surface equipment (not shown) that receives and analyzes the data detected by the sensor devices 138 and determines one or more downhole conditions pertaining to the formation 106 or the casing string.

Figure 3:
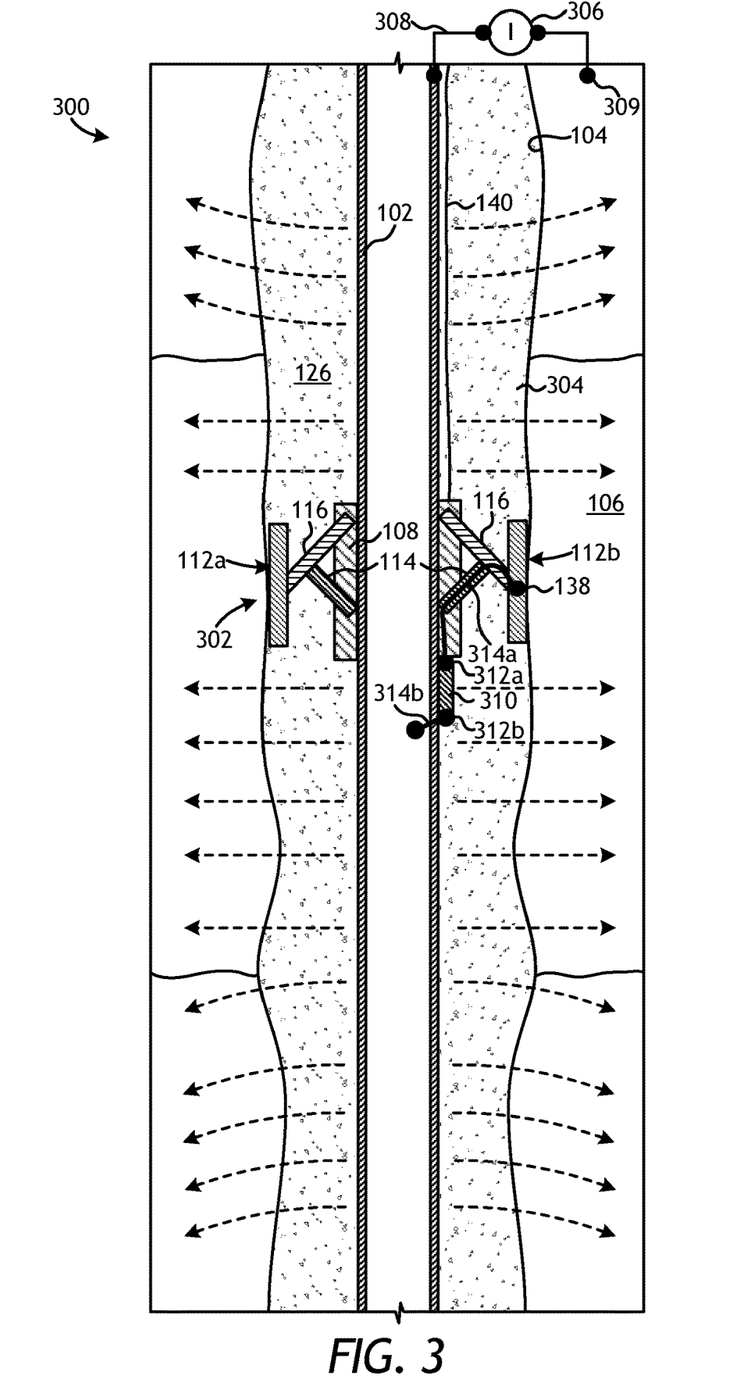
FIG. 3 is a schematic of an exemplary well system that may employ one or more principles of the present disclosure.

Referring now to FIG. 3, with continued reference to the prior figures, illustrated is an exemplary well system 300 that may employ one or more principles of the present disclosure, according to one or more embodiments. As illustrated, the well system 300 may include at least one downhole sensor deployment assembly 302 positioned downhole within the borehole 104. The downhole sensor deployment assembly 302 (hereafter "the assembly 302") may be the same as or similar to either of the assemblies 100 and 200 of FIGS. 1A-1B and 2A-2C, respectively, and therefore may be best understood with reference thereto, where like numerals represent like elements or components not described again in detail. More particularly, the assembly 302 may include the body 108 coupled to the completion string 102, and one or more sensor pads 112 (shown as sensor pads 112a and 112b) may be movable between the retracted and actuated positions using corresponding actuators 114 and arms 116. Again, while only two sensor pads 112a,b are depicted in FIG. 3, it will be appreciated that more or less than two sensor pads 112a,b may be employed, without departing from the scope of the disclosure, including six sensor pads 112 equidistantly spaced about the circumference of the body 108.

Moreover, while only one assembly 302 is depicted in FIG. 3, it will be appreciated that one or more additional downhole sensor deployment assemblies may be employed in the well system 300, without departing from the scope of the disclosure. In such embodiments, the downhole sensor deployment assemblies (including the assembly 302) may be axially spaced along all or a portion of the length of the completion string 102 adjacent the formation 106 and depending on the required vertical resolution. In some embodiments, and depending at least partially on the formation 106, example spacing between axially adjacent downhole sensor deployment assemblies may range from about fifteen feet to about thirty feet, but may alternatively be spaced by less than fifteen feet or greater than thirty feet, without departing from the scope of the disclosure.

The assembly 302 is depicted in FIG. 3 in the actuated position, where the sensor pads 112a,b have been moved radially outwards and into contact with the wall of the borehole 104, as generally described above. Each sensor pad 112a,b may exhibit dimensions and/or structural configurations that are configured to provide adequate contact with the wall of the borehole 104 when moved to the actuated position. In at least one embodiment, for instance, one or more of the sensor pads 112a,b may be about two inches wide and about six inches long. The width and length dimensions may be chosen to be as large as possible to minimize the contact resistance against the wall of the borehole 104 while also small azimuthally to minimize shorting of azimuthal variations.

Once the sensor pads 112a,b are moved to the actuated position, the assembly 302 may be secured within the borehole 104 by pumping a cement 304 into the annulus 126 defined between the completion string 102 and the wall of the borehole 104. As described in more detail below, the cement 304 may exhibit a resistivity that is similar to or the same as the formation 106.

The sensor pads 112a,b may include and otherwise comprise one or more sensor devices 138 used to acquire data from the formation 106 and/or from the wall of the borehole 104. More particularly, the sensor device(s) 138 in FIG. 3 may comprise an electromagnetic sensor or electrode capable of monitoring the resistivity of the formation 106. For simplicity, only the sensor device 138 in the second sensor pad 112b is depicted in FIG. 3, but it will be appreciated that each sensor pad 112a,b of the assembly 302 may include corresponding sensor devices 138, without departing from the scope of the disclosure.

In exemplary operation of the well system 300, current may be injected into the formation 106 from the completion string 102, as indicated by the multiple dashed arrows extending from the completion string 102. More particularly, current "I" may be supplied to the completion string 102 from a power source 306, such as a generator (not shown) arranged at a surface location. In some embodiments, the power source 306 may be directly coupled to a wellhead installation (not shown) from which the completion string 102 may extend into the borehole 104. As a result, the current provided by the power source 306 may be provided to the completion string 102 via the wellhead installation. In other embodiments, however, a power cable 308 may extend from the power source 306 and into the borehole 104 to be coupled to the completion string 102 at a location at or near the formation 106 of interest. Multiple connections between the power cable 308 and the completion string 102 may be made, if necessary.

The current may be conducted through the completion string 102 and may leak into the surrounding formation 106 along all or a portion of its length, as indicated by the multiple arrows. The injected current may be able to conduct through the cement 304, which may be conductive, and subsequently into the formation 106. To enable current conduction into the formation 106 without shorting the sensor device(s) 138 to the completion string 102, the cement 304 may exhibit a resistivity that is within the same order of magnitude of the resistivity of the formation 106. For example, if the resistivity of the formation 106 is about 100 ohmmeters, then the cement 304 may be selected and otherwise configured to exhibit a resistivity ranging between about 50 ohmmeters and about 150 ohmmeters.

After passing through the cement 304 and into the formation 106, the current may then flow toward a return electrode 309 positioned away from the completion string 102 to complete the circuit. An exemplary frequency of operation for the well system 300 may range from DC to about 100 KHz. Lower frequencies may be used with longer spacings between axially adjacent downhole sensor deployment assemblies (including the assembly 302), and may result in deep sensitivity into the formation 106. Higher frequencies may be used with shorter spacings between axially adjacent downhole sensor deployment assemblies (including the assembly 302), and may result in more shallow sensitivity into the formation 106.

In the illustrated embodiment, the arms 116 may be non-conductive and otherwise made of a non-conducting material. As a result, the sensor device(s) 138 may be electrically isolated from the completion string 102. Suitable materials for the non-conducting arms 116 include, but are not limited to, a resin, an epoxy, a composite material (e.g., fiberglass, carbon fiber, etc.), a ceramic, and any combination thereof. Moreover, the sensor pads 112*a,b* may be made of a galvanic and/or conductive material, such as copper or steel, thereby effectively rendering the sensor device(s) 138 as capacitive electrodes. As will be appreciated, capacitive electrodes may prove advantageous in exhibiting stable contact resistance against the formation 106 and being less vulnerable to corrosion over time. Moreover, in at least one embodiment, the power source 306 may be used to anodize the completion string 102 and thereby help prevent or minimize corrosion of the completion string 102 over time.

During operation, the sensor device(s) 138 may be used as monitoring electrodes that measure the potential difference between the completion string 102 and the sensor pads 112*a,b*, where the measured potential difference is proportional to the effective resistivity of the surrounding formation 106. Any voltage changes registered by the sensor device(s) 138 during operation may be indicative of, for example, an approaching water flood in the formation 106. Alternatively, voltage changes registered by the sensor device(s) 138 may be indicative of water alternating gas (WAG) or a $CO_2$ flood (or any other commonly used methods for hydrocarbon production). Resistivity may also be used to monitor injection and fluid front monitoring during carbon capture and sequestration (CCS) operations.

To determine the potential difference, the well system 300 may further include an electronic subassembly 310 coupled or otherwise attached to the completion string 102 at or near the assembly 302. The electronic subassembly 310 may be communicably coupled to the sensor device(s) 138 at a first terminal 312*a* via a first wire 314*a* and may be communicably coupled to the completion string 102 at a second terminal 312*b* via a second wire 314*b*. As a result, the electronic subassembly 310 may be capable of simultaneously receiving voltage measurements obtained by the sensor device(s) 138 and voltage measurements of the completion string 102, whereby the electronic subassembly 310 may be configured to calculate or otherwise determine the potential difference between the two measurements. The electronic subassembly 310 may also be communicably coupled to the communication line 140 and otherwise configured to send signals indicative of the measured potential difference to a surface location (not shown) via the communication line 140.

In some embodiments, the electronic subassembly 310 may comprise an electronic switching circuit used to multiplex signals from the various sensor device(s) 138 and convey the data to the communication line 140 for communication uphole to the surface location. In other embodiments, however, the electronic subassembly 310 may comprise an electromechanical transducer, such as a piezoelectric transducer, operable to convert a measured voltage into strain on a fiber optic cable (e.g., the communication line 140). The potential difference developed between the completion string 102 and each sensor device 138 may be applied to and deform the electromechanical transducer. Such deformation may induce strain in the optical fiber bonded to it, and such strain may be linearly proportional to the applied potential difference. The strain induced into the optical fiber may be interrogated at the surface location using known fiber optic multiplexing and interrogation techniques to determine the potential difference.

Moreover, signals from other downhole sensor deployment assemblies used in the well system 300 and located at different axial locations along the completion string 102 may be communicated over the same fiber optic cable (e.g., the communication line 140). Such signals from the additional downhole sensor deployment assemblies may be differentiated at the surface location using known fiber optic multiplexing and interrogation techniques. As will be appreciated, this may obviate the need for multiplexing circuitry downhole. Furthermore, fiber optic sensors and cable can be packaged in a single tubing encapsulated cable (TEC) that may be clamped to the completion string 102 as it is deployed into the borehole 104.

As will be appreciated, the multiple sensor pads 112*a,b* may be used to obtain azimuthal measurements of the formation 106 and, therefore, provide an indication of the general direction of an approaching water flood propagating through the formation 106. More particularly, the potential difference between the completion string 102 and the sensor devices 138 in each sensor pad 112*a,b* may be determined to provide azimuthal measurements that may enable directional sensitive reservoir monitoring used in detecting the direction of an approaching water flood.

Those skilled in the art will readily appreciate the advantages that the well system 300 may provide. For instance, as compared with prior downhole sensor deployment methods, the sensor pads 112*a,b* and associated sensor devices 138 may be positioned as far as possible from the completion string 102 and pushed against the wall of the borehole 104 as the sensor pads 112*a,b* are moved to the actuated position. This may result in increased signal levels as the measured potential difference between the sensor devices 138 and the completion string 102 is proportional to the radial spacing therebetween. This may also result in increased azimuthal sensitivity since the sensor pads 112*a,b* may be angularly spaced from each other about the assembly 302 at a larger overall diameter and, therefore, at larger angular spacings.

Figure 4A:
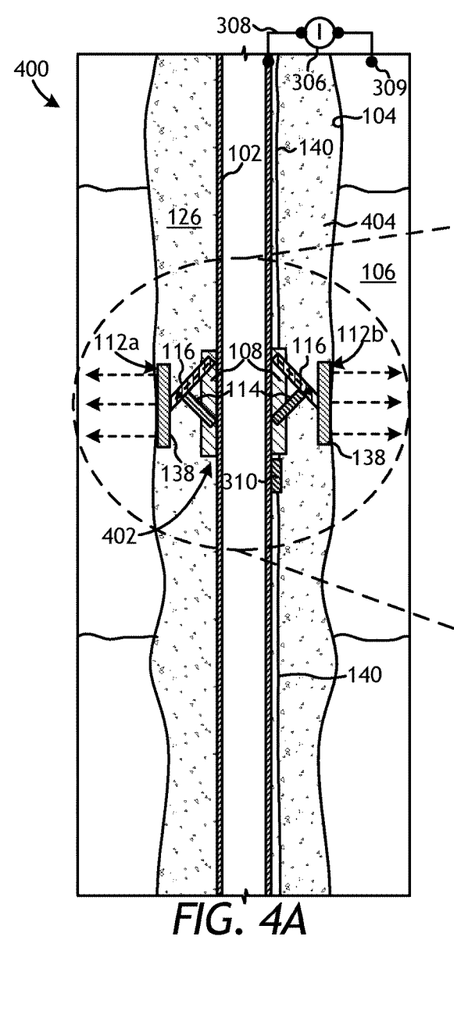
FIGS. 4A and 4B are schematic diagrams of another exemplary well system that may employ one or more principles of the present disclosure.
Figure 4B:
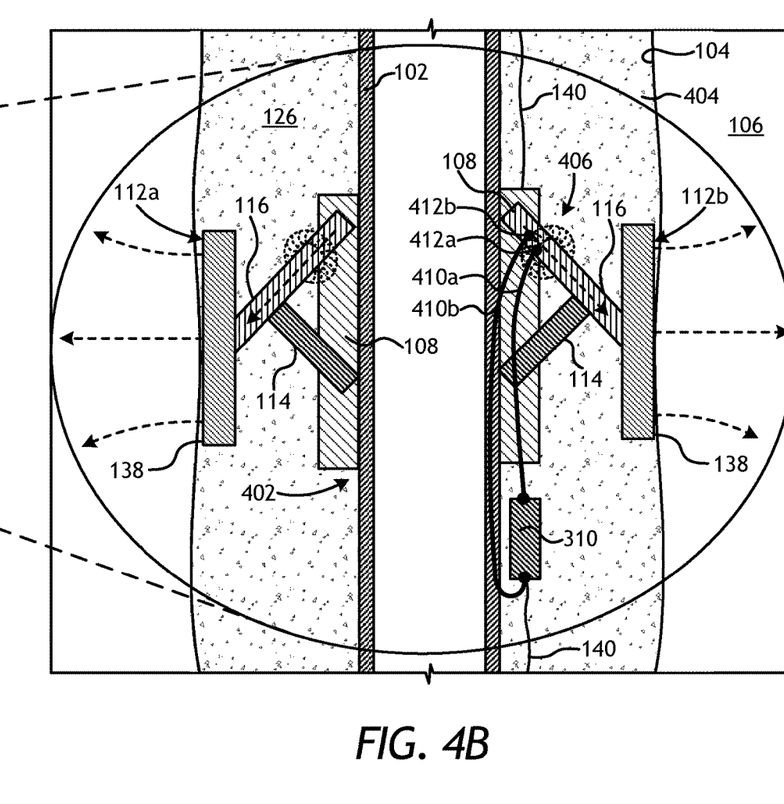

Referring now to FIGS. 4A and 4B, illustrated is another exemplary well system 400 that may employ one or more principles of the present disclosure, according to one or more embodiments. FIG. 4A depicts a cross-sectional view of the well system 400, and FIG. 4B depicts an enlarged cross-sectional view of a portion of the well system 400 as indicated in FIG. 4A. The well system 400 may be similar in some respects to the well system 300 of FIG. 3 and therefore may be best understood with reference thereto, where like numerals indicate like elements not described again in detail.

The well system 400 may include at least one downhole sensor deployment assembly 402 positioned within the borehole 104. The downhole sensor deployment assembly 402 (hereafter "the assembly 402") may be the same as or similar to either of the assemblies 100 and 200 of FIGS. 1A-1B and 2A-2C, respectively, and therefore may be best understood with reference thereto, where like numerals represent like elements or components not described again in detail. More particularly, the assembly 402 may include the body 108 coupled to the completion string 102, and one or more sensor pads 112 (shown as sensor pads 112a and 112b) may be movable between the retracted and actuated positions using corresponding actuators 114 and arms 116.

While only two sensor pads 112a,b are depicted in FIGS. 4A and 4B, it will be appreciated that more or less than two sensor pads 112a,b may be employed, without departing from the scope of the disclosure. Moreover, while only one assembly 402 is depicted in FIGS. 4A and 4B, it will be appreciated that one or more additional downhole sensor deployment assemblies may be employed in the well system 400, without departing from the scope of the disclosure. Once the sensor pads 112a,b are moved to the actuated position, as shown in FIGS. 4A and 4B, the assembly 402 may be secured within the borehole 104 by pumping a cement 404 into the annulus 126 defined between the completion string 102 and the wall of the borehole 104.

In the illustrated embodiment, the sensor devices 138 of each sensor pad 112a,b may be used as a type of transceiver or transmitter, where current "I" provided to the completion string 102 from the power source 306 may be injected into the formation 106 from the sensor devices 138, as indicated by the multiple dashed arrows extending from the sensor pads 112a,b. In such embodiments, the completion string 102 may be substantially insulated from the formation 106 with the cement 404, which may exhibit a high resistivity and otherwise comprise an electrically-insulating cement. Moreover, in such embodiments, the arms 116 and the sensor pads 112a,b may each be made of electrically-conductive materials to allow the current to conduct from the completion string 102, through the arms 116, and out the sensor devices 138 via the sensor pads 112a,b.

Suitable electrically-conductive materials for the arm 116 include, but are not limited to, steel, copper, and any alloys thereof. The sensor pads 112a,b may be made of or otherwise covered with soft, conducting material, such as copper or a copper alloy, to maximize the contact area against the formation 106 and otherwise prevent the cement 404 from obscuring the electrical contact between the sensor pads 112a,b and the wall of the borehole 104. Accordingly, the current in the well system 400 may be focused and allowed to leak only through the sensor pads 112a,b rather than along the entire length of the completion string 102. As will be appreciated, this may prove advantageous in increasing the intensity of subsequently measured signals.

During operation, the assembly 402 may be used to measure the potential difference between the completion string 102 and the sensor pads 112a,b, where the measured potential difference is proportional to the effective resistivity of the surrounding formation 106. More particularly, and with reference to FIG. 4B, the system 400 may further include the electronic subassembly 310 and a toroid 406 (shown in dashed lines and enlarged for ease of viewing) communicably coupled to the sensor device(s) 138 of each sensor pad 112a,b. The set up for only one toroid 406 is shown in FIG. 4B for simplicity. As illustrated, the toroid 406 may include a first wire 410a that extends between the electronic subassembly 310 and the sensor device(s) 138 (e.g., the arm 116 as electrically coupled to the corresponding sensor device(s) 138) to detect voltage at a first terminal 412a. Moreover, the toroid 406 may include a second wire 410b that extends between the electronic subassembly 310 and the completion string 102 (e.g., the arm 116 as electrically coupled to the completion string 102) to detect voltage at a second terminal 412b.

The toroid 406 may be configured to make directional sensitive measurements of the formation 106 by measuring the current leaking from the arm 116. As current flows through the arm 116, it generates a magnetic field and the toroid 406 inductively converts the magnetic field into a voltage across the toroid terminals 412a and 412b. This voltage is applied through wires 410a and 410b to the electronic subassembly 310 (e.g., an electronic transducer), which applies the voltage to the communication line 140 coupled thereto. Any voltage or potential difference changes detected by the subassembly 310 may be indicative of, for example, an approaching water flood in the formation 106.

As with the well system 300 of FIG. 3, the multiple sensor pads 112a,b in the well system 400 may also be used to obtain azimuthal measurements of the formation 106 and, therefore, indicate the direction of an approaching water flood in the formation 106. Signals generated by the electronic subassembly 310 may be transmitted to a surface location (not shown) via the communication line 140 for consideration by an operator. Moreover, signals from other downhole sensor deployment assemblies used in the well system 400 and located at different axial locations along the completion string 102 may be communicated over the same communication line 140. In embodiments where the communication line 140 comprises a fiber optic cable, such signals from the additional downhole sensor deployment assemblies may be differentiated at the surface location using known fiber optic multiplexing and interrogation techniques.

Figure 5A:
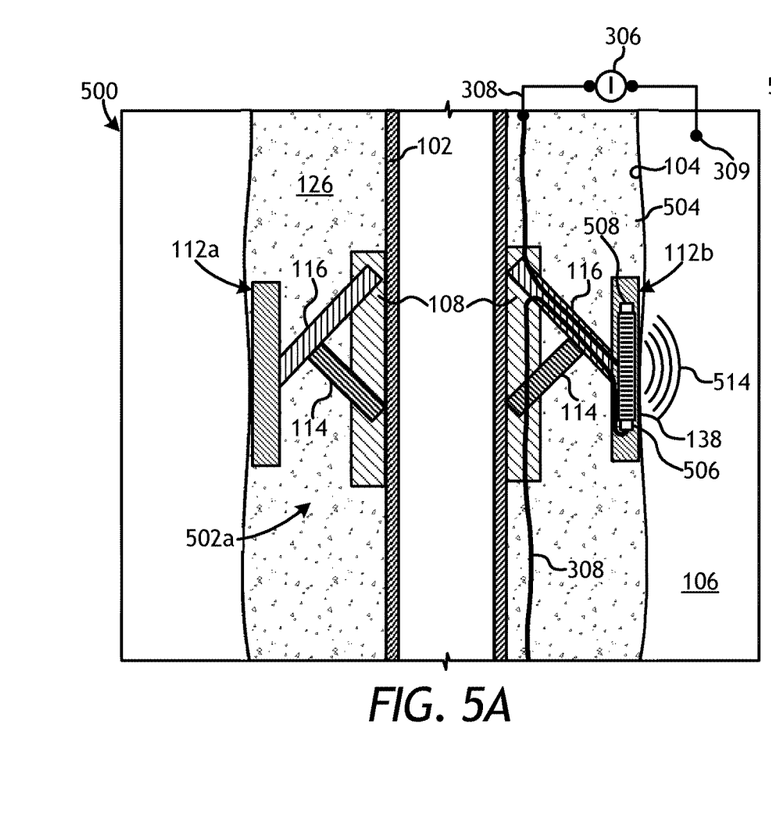
FIGS. 5A and 5B are cross-sectional side views of another exemplary well system that may employ one or more principles of the present disclosure.
Figure 5B:
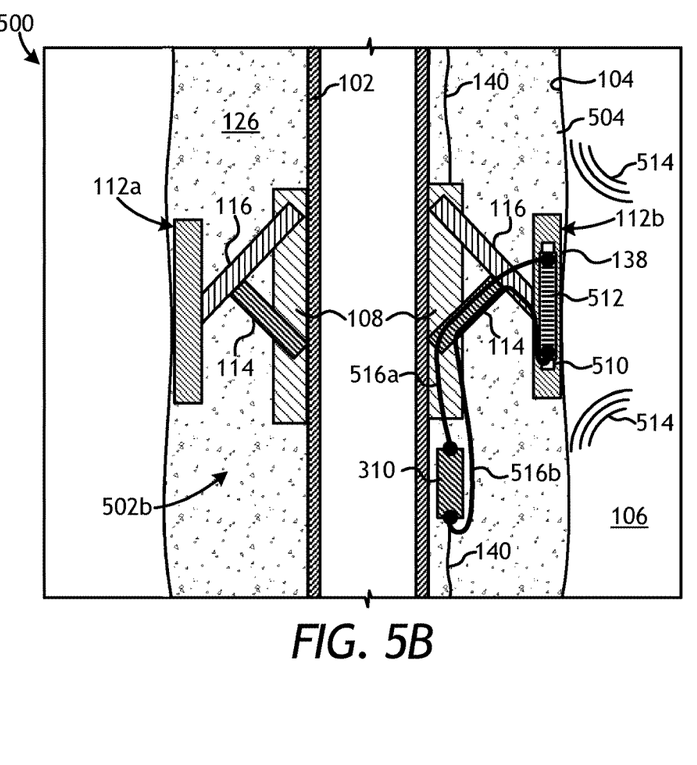

Referring now to FIGS. 5A and 5B, illustrated are enlarged cross-sectional views of yet another exemplary well system 500, according to one or more embodiments. More particularly, FIG. 5A depicts a cross-sectional view of a first downhole sensor deployment assembly 502a (hereafter "the assembly 502a"), and FIG. 5B depicts a cross-sectional view of a second downhole sensor deployment assembly 502b (hereafter "the assembly 502b"), where each assembly 502a,b forms part of the well system 500. For instance, the first assembly 502a may be positioned within the borehole 104 at a first location, and the second assembly 502b may be positioned within the borehole 104 at a second location that is axially offset from the first location.

Each of the assemblies 502a,b may be the same as or similar to either of the assemblies 100 and 200 of FIGS. 1A-1B and 2A-2C, respectively, and therefore may be best understood with reference thereto, where like numerals represent like elements or components not described again in detail. More particularly, each assembly 502a,b may include the body 108 coupled to the completion string 102, and one or more sensor pads 112 (shown as sensor pads 112a and 112b) may be movable to the actuated position using corresponding actuators 114 and arms 116. While only two sensor pads 112a,b are depicted as forming part of each assembly 502a,b, it will be appreciated that more or less than two sensor pads 112a,b may be employed, without departing from the scope of the disclosure. Once the sensor pads 112a,b are moved to the actuated position, as shown in FIGS. 5A and 5B, the assemblies 502a,b may each be secured within the borehole 104 at their respective locations by pumping a cement 504 into the annulus 126 defined between the completion string 102 and the wall of the borehole 104.

In the illustrated embodiment, the sensor devices 138 of each sensor pad 112a,b may be used as either a transmitter or a receiver, or alternatively, each sensor device 138 may be characterized as a transceiver capable of both transmitting and receiving electromagnetic signals. In at least one embodiment, the first assembly 502a may be configured as a transmitting assembly, where the corresponding sensor devices 138 in each sensor pad 112a,b of the first assembly 502a include a ferrite core 506 and a transmitting coil 508 wrapped about the ferrite core 506. In contrast, the second assembly 502b may be configured as a receiving assembly, where the corresponding sensor devices 138 in each sensor pad 112a,b of the second assembly 502b include a ferrite core 510 and a receiving coil 512 wrapped about the ferrite core 510.

The sensor devices 138 may be embedded within the material of the sensor pads 112a,b of each of the first and second assemblies 502a,b. Moreover, the sensor pads 112a,b of each of the first and second assemblies 502a,b may be made of non-conducting materials that can withstand temperatures and pressures common to downhole environments. Suitable materials for the sensor pads 112a,b of each of the first and second assemblies 502a,b include, but are not limited to, a ceramic, fiberglass, carbon fiber, a plastic, an epoxy resin, and any combination thereof.

In exemplary operation, a current "I" may be provided to the first assembly 502a from the power source 306 either via the completion string 102 or otherwise via the power cable 308 extending downhole from the power source 306 and directly coupling to the sensor devices 138 in the sensor pads 112a,b. In some embodiments, the power cable 308 may extend from the ferrite core 506 and further downhole within the borehole 104 to potentially provide power to additional downhole sensor deployment assemblies (not shown) acting as transmitting assemblies. As shown in FIG. 5A, the current provided to the sensor devices 138 in the sensor pads 112a,b of the first assembly 502a may result in the generation of a magnetic field 514 that propagates outward into the formation 106. The magnetic field(s) 514 may subsequently be detected and otherwise received by the sensor devices 138 in the sensor pads 112a,b of the second assembly 502b, as shown in FIG. 5B.

The second assembly 502b may include the electronic subassembly 310 used to calculate the intensity of the magnetic field(s) 514, and thereby determine the resistivity of the formation 106. More particularly, a first voltage may be known as provided to the first assembly 502a by the power source 306, and the second assembly 502b may be configured to convert the magnetic field 514 received from the first assembly 502a into a second voltage, which may be transmitted to the electronic subassembly 310 via first and second wires 516a and 516b. The electronic subassembly 310 may be configured to transmit the second voltage data to the surface location via the communication line 140. As in prior embodiments, the measured voltage (i.e., potential difference) is proportional to the effective resistivity of the surrounding formation 106, and any voltage or potential difference changes between the first and second voltages may be indicative of, for example, an approaching water flood in the formation 106.

Accordingly, while the well systems 300 and 400 of FIGS. 3 and 4A-4B, respectively, present directional sensitive galvanic sensing systems through current conduction, the well system 500 of FIGS. 5A-5B may be configured to present a directional sensitive induction system. The frequency of operation of this induction monitoring well system 500 may range from about 1 KHz to about 100 KHz, for example. Moreover, as with the well systems 300 and 400 of FIGS. 3 and 4A-4B, respectively, the multiple sensor pads 112a,b in the second assembly 502b may also be used to obtain azimuthal measurements of the formation 106 and, therefore, indicate the direction of an approaching water flood in the formation 106. Signals generated by the electronic subassembly 310 may be transmitted to a surface location (not shown) via the communication line 140 for consideration by an operator. Moreover, signals from other downhole sensor deployment assemblies used as receiving assemblies (similar to the second assembly 502b) and located at different axial locations along the completion string 102 may be communicated over the same communication line 140. In embodiments where the communication line 140 comprises a fiber optic cable, such signals from the additional downhole sensor deployment assemblies may be differentiated at the surface location using known fiber optic multiplexing and interrogation techniques.

Embodiments disclosed herein include:

A. A downhole sensor deployment assembly that includes a body attachable to a completion string, one or more arms pivotably coupled to the body, a sensor pad coupled to each arm and movable from a retracted position, where the sensor pad is stowed adjacent the completion string, and an actuated position, where the sensor pad is extended radially away from the completion string, one or more actuators pivotably coupled to the body at a first end and pivotably coupled to a corresponding one of the one or more arms at a second end, the one or more actuators being operable to move the sensor pad to the actuated position, and one or more sensor devices coupled to the sensor pad and comprising at least one of a sensing electrode, a transceiver, and a transmitter.

B. A well system that includes a completion string extendable into a borehole penetrating a formation, at least one downhole sensor deployment assembly secured to the completion string and including a body coupled to the completion string, one or more arms pivotably coupled to the body, a sensor pad coupled to each arm and movable from a retracted position, where the sensor pad is stowed adjacent the completion string, and an actuated position, where the sensor pad is extended radially away from the completion string to contact one of the formation and an inner wall of a casing string secured within the borehole, one or more actuators pivotably coupled to the body at a first end and pivotably coupled to a corresponding one of the one or more arms at a second end, the one or more actuators being operable to move the sensor pad to the actuated position, and one or more sensor devices coupled to the sensor pad for determining at least a resistivity of the formation, the one or more sensor devices comprising at least one of a sensing electrode, a transceiver, and a transmitter. The well system further including a communication line communicably coupled to the at least one downhole sensor deployment assembly for transmitting signals indicative of the resistivity of the formation to a surface location.

C. A method that includes extending a completion string into a borehole penetrating a formation, the completion string having at least one downhole sensor deployment assembly secured thereto and including a body coupled to the completion string, one or more arms pivotably coupled to the body, a sensor pad coupled to each arm, one or more actuators pivotably coupled to the body at a first end and pivotably coupled to a corresponding one of the one or more arms at a second end, and one or more sensor devices coupled to the sensor pad and comprising at least one of a sensing electrode, a transceiver, and a transmitter. The method further including actuating the one or more actuators to extend the sensor pad from a retracted position, where the sensor pad is stowed adjacent the completion string, and to an actuated position, where the sensor pad is extended radially away from the completion string to contact one of the formation and an inner wall of a casing string secured within the borehole, determining a resistivity of the formation with the one or more sensor devices, and transmitting signals indicative of the resistivity of the formation to a surface location via a communication line communicably coupled to the at least one downhole sensor deployment assembly.

Each of embodiments A, B, and C may have one or more of the following additional elements in any combination: Element 1: wherein the one or more actuators are hydraulic piston actuators, and wherein each hydraulic piston actuator comprises a piston chamber, a piston movably positioned within the piston chamber and having a stem that extends out of the piston chamber and is pivotably coupled to the corresponding one of the one or more arms, and a frangible member arranged in a wall of the piston chamber and being configured to fail upon assuming a predetermined pressure threshold. Element 2: wherein the one or more actuators comprise an actuation device selected from the group consisting of a hydraulic a hydraulic actuator, a pneumatic actuator, an electric actuator, an electromechanical actuator, a motor, and any combination thereof. Element 3: further comprising one or more centralizers coupled to the body and exhibiting an outside diameter greater than an outside diameter the sensor pad while in the retracted position. Element 4: wherein the one or more sensor devices comprise at least one of electromagnetic sensing electrodes, optical electromagnetic sensors, and distributed feedback fiber laser strain sensors. Element 5: wherein the one or more sensor devices operate to determine a resistivity of a formation, the downhole sensor deployment assembly further comprising an electronic subassembly communicably coupled to the one or more sensor devices and the completion string to determine a voltage potential difference between the one or more sensor devices and the completion string, wherein the voltage potential difference is indicative of the resistivity of the formation, and a communication line communicably coupled to the electronic subassembly for transmitting signals indicative of the resistivity of the formation to a surface location. Element 6: wherein the electronic subassembly comprises an electromechanical transducer and the communication line comprises a fiber optic cable. Element 7: wherein at least one of the one or more arms and the sensor pad is U-shaped and includes extended sides that protect a corresponding one of the one or more actuators and electrical wires extending from the one or more sensor devices.

Element 8: wherein the one or more arms comprise a plurality of arms angularly spaced about a circumference of the body, and each sensor pad of the plurality of arms facilitate azimuthal measurements of the formation to detect a direction of an approaching water flood propagating through the formation. Element 9: wherein the completion string is secured within the borehole with a conductive cement disposed in an annulus defined between the completion string and a wall of the borehole, wherein current is injectable into the formation via the completion string and through the cement, wherein the one or more arms are non-conductive and the sensor pad is conductive, and wherein the one or more sensor devices comprise electromagnetic sensing electrodes capable of detecting the resistivity of the formation. Element 10: further comprising an electronic subassembly communicably coupled to the one or more sensor devices and the completion string to determine a voltage potential difference between the one or more sensor devices and the completion string, wherein the voltage potential difference is indicative of the resistivity of the formation. Element 11: wherein the completion string is secured within the borehole with a non-conductive cement disposed in an annulus defined between the completion string and a wall of the borehole, wherein the one or more arms and the corresponding sensor pads are made of conductive materials, and wherein current is injectable into the formation via the one or more sensor devices as supplied through the completion string. Element 12: further comprising an electronic subassembly communicably coupled to the communication line, and a toroid communicably coupled to the electronic subassembly and the one or more sensor devices, the toroid being used to measure current leaking from the one or more sensor devices into the formation and thereby obtain a voltage potential difference indicative of the resistivity of the formation. Element 13: wherein the at least one downhole sensor deployment assembly is a first downhole sensor deployment assembly and the one or more sensor devices are one or more first sensor devices coupled to a first sensor pad, the well system further comprises a second downhole sensor deployment assembly axially offset from the first downhole sensor deployment assembly and secured to the completion string, the second downhole sensor deployment assembly including one or more second arms pivotably coupled to a second body attached to the completion string, a second sensor pad coupled to each second arm and movable from a retracted position, where the second sensor pad is stowed adjacent the completion string, and an actuated position, where the second sensor pad is extended radially away from the completion string to contact the formation, one or more second actuators pivotably coupled to the second body at a first end and pivotably coupled to a corresponding one of the one or more second arms at a second end, the one or more second actuators being operable to move the second sensor pad to the actuated position, and one or more second sensor devices coupled to the second sensor pad and comprise transmitters that inject a magnetic field into the formation. The well system further including a power cable providing current to the one or more second sensor devices to generate the magnetic field, wherein the one or more first sensor devices comprise receiving coils operable to detect the magnetic field propagating through the formation. Element 14: wherein the completion string is secured within the borehole with cement disposed in an annulus defined between the completion string and a wall of the borehole, and wherein the cement is non-conductive and the one or more first and second sensor devices are embedded within a non-conductive material of the first and second sensor pads, respectively, the well system further comprising an electronic subassembly communicably coupled to the one or more first sensor devices to determine a voltage potential difference indicative of the resistivity of the formation.

Element 15: wherein the one or more actuators are hydraulic piston actuators that each comprise a piston chamber, a piston movably positioned within the piston chamber and pivotably coupled to the corresponding one of the one or more arms, and a frangible member arranged in a wall of the piston chamber, and wherein actuating the one or more actuators comprises increasing a fluid pressure within an annulus defined between the completion string and a wall of the borehole, rupturing the frangible member when the fluid pressure surpasses a predetermined pressure limit and thereby allowing fluid to enter the piston chamber, and moving the piston within the piston chamber with the fluid and thereby acting on the corresponding one of the one or more arms to force the sensor pad against the wall of the borehole. Element 16: wherein the at least one downhole sensor deployment assembly further includes one or more centralizers coupled to the body, the method further comprising extending the completion string into the borehole with the sensor pad in the retracted position, and protecting the one or more sensor devices while moving within the borehole with the one or more centralizers, the one or more centralizers exhibiting an outside diameter greater than an outside diameter the sensor pad while in the retracted position. Element 17: wherein the one or more arms comprise a plurality of arms angularly spaced about a circumference of the body, the method further comprising obtaining azimuthal measurements of the formation with each sensor pad of the plurality of arms and thereby detecting a direction of an approaching water flood propagating through the formation. Element 18: further comprising disposing cement within an annulus defined between the completion string and a wall of the borehole and thereby securing the at least one downhole sensor deployment assembly within the borehole, injecting current into the formation via the completion string, wherein the cement is conductive, detecting the resistivity of the formation with the one or more sensor devices, wherein the one or more arms are non-conductive and the sensor pad is conductive, and determining a voltage potential difference between the one or more sensor devices and the completion string with an electronic subassembly communicably coupled to the one or more sensor devices and the completion string, wherein the voltage potential difference is indicative of the resistivity of the formation. Element 19: further comprising disposing cement within an annulus defined between the completion string and a wall of the borehole and thereby securing the at least one downhole sensor deployment assembly within the borehole, injecting current into the formation via the one or more sensor devices as supplied through the completion string, wherein the cement is non-conductive, and wherein the one or more arms and the corresponding sensor pads are made of conductive materials, measuring current leaking from the one or more sensor devices into the formation with a toroid communicably coupled to the one or more sensor devices, and transmitting a voltage potential difference indicative of the resistivity of the formation with an electronic subassembly communicably coupled to the toroid and the communication line. Element 20: wherein the at least one downhole sensor deployment assembly is a first downhole sensor deployment assembly and a second downhole sensor deployment assembly is axially offset from the first downhole sensor deployment assembly and secured to the completion string, the method further comprising disposing cement within an annulus defined between the completion string and a wall of the borehole and thereby securing the at least one downhole sensor deployment assembly within the borehole, providing current to the second downhole sensor deployment assembly via a power cable and thereby generating a magnetic field, wherein the cement is non-conductive, detecting the magnetic field propagating through the formation with the first downhole sensor deployment assembly, wherein sensor pads of each of the first and second downhole sensor deployment assemblies are made of a non-conductive material, and determining a voltage potential difference indicative of the resistivity of the formation with an electronic subassembly communicably coupled to the first downhole sensor deployment assembly. Element 21: wherein the sensor pad is extended to contact the inner wall of the casing string, the method further comprising inspecting the casing string for corrosion with the sensor pad.

By way of non-limiting example, exemplary combinations applicable to A, B, and C include: Element 5 with Element 6; Element 9 with Element 10; Element 11 with Element 12; and Element 13 with Element 14.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A downhole sensor deployment assembly, comprising:
a body attachable to a completion string;
one or more arms pivotably coupled to the body;
a sensor pad coupled to each arm and movable from a retracted position, where the sensor pad is stowed adjacent the completion string, and an actuated position, where the sensor pad is extended radially away from the completion string;
one or more actuators pivotably coupled to the body at a first end and pivotably coupled to a corresponding one of the one or more arms at a second end, the one or more actuators being operable to move the sensor pad to the actuated position, wherein the one or more actuators are hydraulic piston actuators, and wherein each hydraulic piston actuator comprises a piston chamber, a piston movably positioned within the piston chamber and having a stem that extends out of the piston chamber and is pivotably coupled to the corresponding one of the one or more arms, and a frangible member arranged in a wall of the piston chamber and being configured to fail upon assuming a predetermined pressure threshold to allow the piston to move within the piston chamber upon failure of the frangible member; and
one or more sensor devices coupled to the sensor pad and comprising at least one of a sensing electrode, a transceiver, and a transmitter.

2. The downhole sensor deployment assembly of claim 1, wherein the one or more actuators comprise an actuation device selected from the group consisting of a hydraulic actuator, a pneumatic actuator, an electric actuator, an electromechanical actuator, a motor, and any combination thereof.

3. The downhole sensor deployment assembly of claim 1, further comprising one or more centralizers coupled to the body and exhibiting an outside diameter greater than an outside diameter the sensor pad while in the retracted position.

4. The downhole sensor deployment assembly of claim 1, wherein the one or more sensor devices comprise at least one of electromagnetic sensing electrodes, optical electromagnetic sensors, and distributed feedback fiber laser strain sensors.

5. The downhole sensor deployment assembly of claim 1, wherein the one or more sensor devices operate to determine a resistivity of a formation, the downhole sensor deployment assembly further comprising:
an electronic subassembly communicably coupled to the one or more sensor devices and the completion string to determine a voltage potential difference between the one or more sensor devices and the completion string, wherein the voltage potential difference is indicative of the resistivity of the formation; and
a communication line communicably coupled to the electronic subassembly for transmitting signals indicative of the resistivity of the formation to a surface location.

6. The downhole sensor deployment assembly of claim 5, wherein the electronic subassembly comprises an electromechanical transducer and the communication line comprises a fiber optic cable.

7. The downhole sensor deployment assembly of claim 1, wherein at least one of the one or more arms and the sensor pad is U-shaped and includes extended sides that protect a corresponding one of the one or more actuators and electrical wires extending from the one or more sensor devices.

8. A well system, comprising:
a completion string extendable into a borehole penetrating a formation;
at least one downhole sensor deployment assembly secured to the completion string and including:
a body coupled to the completion string;
one or more arms pivotably coupled to the body;
a sensor pad coupled to each arm and movable from a retracted position, where the sensor pad is stowed adjacent the completion string, and an actuated position, where the sensor pad is extended radially away from the completion string to contact one of the formation and an inner wall of a casing string secured within the borehole;
one or more actuators pivotably coupled to the body at a first end and pivotably coupled to a corresponding one of the one or more arms at a second end, the one or more actuators being operable to move the sensor pad to the actuated position, wherein the one or more actuators are hydraulic piston actuators, and wherein each hydraulic piston actuator comprises a piston chamber, a piston movably positioned within the piston chamber and having a stem that extends out of the piston chamber and is pivotably coupled to the corresponding one of the one or more arms, and a frangible member arranged in a wall of the piston chamber and being configured to fail upon assuming a predetermined pressure threshold to allow the piston to move within the piston chamber upon failure of the frangible member; and
one or more sensor devices coupled to the sensor pad for determining at least a resistivity of the formation, the one or more sensor devices comprising at least one of a sensing electrode, a transceiver, and a transmitter; and
a communication line communicably coupled to the at least one downhole sensor deployment assembly for transmitting signals indicative of the resistivity of the formation to a surface location.

9. The well system of claim 8, wherein the one or more arms comprise a plurality of arms angularly spaced about a circumference of the body, and each sensor pad of the plurality of arms facilitate azimuthal measurements of the formation to detect a direction of an approaching water flood propagating through the formation.

10. The well system of claim 8, wherein the completion string is secured within the borehole with a conductive cement disposed in an annulus defined between the completion string and a wall of the borehole, wherein current is injectable into the formation via the completion string and through the cement, wherein the one or more arms are non-conductive and the sensor pad is conductive, and wherein the one or more sensor devices comprise electromagnetic sensing electrodes capable of detecting the resistivity of the formation.

11. The well system of claim 10, further comprising an electronic subassembly communicably coupled to the one or more sensor devices and the completion string to determine a voltage potential difference between the one or more sensor devices and the completion string, wherein the voltage potential difference is indicative of the resistivity of the formation.

12. The well system of claim 8, wherein the completion string is secured within the borehole with a non-conductive cement disposed in an annulus defined between the completion string and a wall of the borehole, wherein the one or more arms and the corresponding sensor pads are made of conductive materials, and wherein current is injectable into the formation via the one or more sensor devices as supplied through the completion string.

13. The well system of claim 12, further comprising:
an electronic subassembly communicably coupled to the communication line; and
a toroid communicably coupled to the electronic subassembly and the one or more sensor devices, the toroid being used to measure current leaking from the one or more sensor devices into the formation and thereby obtain a voltage potential difference indicative of the resistivity of the formation.

14. The well system of claim 8, wherein the at least one downhole sensor deployment assembly is a first downhole sensor deployment assembly and the one or more sensor devices are one or more first sensor devices coupled to a first sensor pad, the well system further comprises:
a second downhole sensor deployment assembly axially offset from the first downhole sensor deployment assembly and secured to the completion string, the second downhole sensor deployment assembly including:
one or more second arms pivotably coupled to a second body attached to the completion string;
a second sensor pad coupled to each second arm and movable from a retracted position, where the second sensor pad is stowed adjacent the completion string, and an actuated position, where the second sensor pad is extended radially away from the completion string to contact the formation;
one or more second actuators pivotably coupled to the second body at a first end and pivotably coupled to a corresponding one of the one or more second arms at a second end, the one or more second actuators being operable to move the second sensor pad to the actuated position; and
one or more second sensor devices coupled to the second sensor pad and comprise transmitters that inject a magnetic field into the formation; and
a power cable providing current to the one or more second sensor devices to generate the magnetic field, wherein the one or more first sensor devices comprise receiving coils operable to detect the magnetic field propagating through the formation.

15. The well system of claim 14, wherein the completion string is secured within the borehole with cement disposed in an annulus defined between the completion string and a wall of the borehole, and wherein the cement is non-conductive and the one or more first and second sensor devices are embedded within a non-conductive material of the first and second sensor pads, respectively, the well system further comprising:
an electronic subassembly communicably coupled to the one or more first sensor devices to determine a voltage potential difference indicative of the resistivity of the formation.

\* \* \* \* \*